(12) United States Patent
Kamiya

(10) Patent No.: US 10,066,666 B2
(45) Date of Patent: Sep. 4, 2018

(54) SPINDLE-BEARING PROTECTING DEVICE AND MACHINE TOOL EQUIPPED WITH THE SAME

(71) Applicant: FANUC CORPORATION, Yamanashi (JP)

(72) Inventor: Youhei Kamiya, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 15/446,307

(22) Filed: Mar. 1, 2017

(65) Prior Publication Data

US 2017/0261033 A1      Sep. 14, 2017

(30) Foreign Application Priority Data

Mar. 11, 2016   (JP) .................................. 2016-048314

(51) Int. Cl.
  *F16C 19/52*     (2006.01)
  *B23Q 11/12*     (2006.01)
  (Continued)

(52) U.S. Cl.
  CPC .......... *F16C 19/525* (2013.01); *B23Q 11/123* (2013.01); *B23Q 11/127* (2013.01); *F16C 19/527* (2013.01); *F16C 33/667* (2013.01); *F16C 33/6659* (2013.01); *F16C 37/007* (2013.01); *H02K 5/1732* (2013.01); *H02K 7/083* (2013.01); *H02K 9/00* (2013.01); *F16C 19/546* (2013.01); *F16C 2233/00* (2013.01); *F16C 2322/39* (2013.01); *F16C 2380/26* (2013.01); *H02K 11/20* (2016.01); *H02K 2209/00* (2013.01)

(58) Field of Classification Search
  CPC .... F16C 19/525; F16C 19/527; B23Q 11/123; B23Q 11/127
  See application file for complete search history.

(56) References Cited

U.S. PATENT DOCUMENTS

| | | | | |
|---|---|---|---|---|
| 4,284,174 A | * | 8/1981 | Salvana | F01D 25/18 184/6.26 |
| 4,527,661 A | * | 7/1985 | Johnstone | B23Q 11/121 184/6.1 |

(Continued)

FOREIGN PATENT DOCUMENTS

| | | |
|---|---|---|
| JP | 55-52927 | 4/1980 |
| JP | 05-231589 | 9/1993 |

(Continued)

*Primary Examiner* — Thomas R Hannon
(74) *Attorney, Agent, or Firm* — Wenderoth, Lind & Ponack, L.L.P.

(57) ABSTRACT

A spindle-bearing protecting device for protecting a bearing that supports a spindle so as to be rotatable, includes: a rotating part positioned further to an outer side in an axial direction than the bearing, and having a rotor blade configured to rotate along with the spindle; a supply part configured to supply coolant or lubricant between the rotor blade and the bearing; a detection unit configured to detect abnormality of the bearing; and a control unit configured to control a supply of the coolant or the lubricant by the supply part and a revolution speed of the spindle, in a case where the detection unit detects abnormality of the bearing.

9 Claims, 4 Drawing Sheets

(51) Int. Cl.
*F16C 33/66* (2006.01)
*F16C 37/00* (2006.01)
*H02K 7/08* (2006.01)
*H02K 9/00* (2006.01)
*H02K 5/173* (2006.01)
*F16C 19/54* (2006.01)
*H02K 11/20* (2016.01)

(56) References Cited

U.S. PATENT DOCUMENTS

| | | | | |
|---|---|---|---|---|
| 5,080,195 A * | 1/1992 | Mizumoto | .......... | F16C 33/6622 |
| | | | | 184/104.1 |
| 2008/0078620 A1* | 4/2008 | Yanohara | ............. | B23Q 11/123 |
| | | | | 184/6.14 |
| 2012/0183247 A1* | 7/2012 | Chamberlin | ........... | H02K 11/25 |
| | | | | 384/448 |
| 2016/0146247 A1* | 5/2016 | Walter | ................... | F16C 19/18 |
| | | | | 310/90.5 |

FOREIGN PATENT DOCUMENTS

| | | |
|---|---|---|
| JP | 9-163683 | 6/1997 |
| JP | 2008-45681 | 2/2008 |
| JP | 2013-50193 | 3/2013 |
| JP | 2014-001854 | 1/2014 |

\* cited by examiner

SPINDLE-BEARING PROTECTING DEVICE AND MACHINE TOOL EQUIPPED WITH THE SAME

This application is based on and claims the benefit of priority from Japanese Patent Application No. 2016-048314, filed on Mar. 11, 2016, the content of which is incorporated herein by reference.

BACKGROUND OF THE INVENTION

Field of the Invention

The present invention relates to a spindle-bearing protecting device and a machine tool equipped with the same.

Related Art

Conventionally, in the case of the spindle of a machine tool or electric motor failing, the cause of the failure is often wear or damage to the bearing. When performing machining using a machine tool or electric motor in a state in which the spindle failed, the precision of the work declines to become inferior. In addition, a great amount of downtime is generated by the time consumed in the restoration of the spindle, and thus the operating ratio of the machine tool declines.

Therefore, technology has been disclosed that, after measuring the deterioration in vibration of the spindle, and detecting a temperature rise, adjusts the amount of lubricant supplied to the bearing in response to the magnitude of the vibration and temperature rise, and prevents the main bearing from being scorched (for example, refer to Patent Documents 1 to 3). In addition, technology has also been disclosed that circulates a cooling medium inside an electric motor by way of a rotor blade (for example, refer to Patent Document 4).

Patent Document 1: Japanese Unexamined Patent Application, Publication No. 2008-045681

Patent Document 2: Japanese Unexamined Patent Application, Publication No. S55-52927

Patent Document 3: Japanese Unexamined Patent Application, Publication No. 2013-050193

Patent Document 4: Japanese Unexamined Patent Application, Publication No. H09-163683

However, a special structure has been necessary in the bearing in order to supply coolant or lubricant into the bearing efficiently. A bearing having such a special structure has not been able to share components with a spindle that does not have a life-extending function and components, while at the same time incurring extra cost.

In addition, it has not been possible to use a contactless sealed grease lubricated bearing with high maintainability at low cost. This is because, when trying to supply coolant or lubricant from outside to a normal contactless sealed bearing, the gap between the bearing seal and the bearing is small, and thus requires high pressure. In such as case, even if supplying coolant or lubricant using high pressure, a part of the coolant or lubricant will be repelled by the bearing seal, and the coolant or lubricant not reaching inside the bearing will adhere to the machine tool, electrical components of the electric motor, etc., and thus there is concern over conversely shortening the lifespan of the spindle.

In addition, with a contact-type seal such as an oil seal, since the spindle of the machine tool achieves high-speed rotation, it has not been possible to suppress discharge prevention of the coolant or lubricant.

SUMMARY OF THE INVENTION

The present invention has been made taking account of the above, and has an object of providing a spindle-bearing protecting device that captures an indication of failure of the spindle bearings of a machine tool and can prolong the time until the main bearing is scorched.

A spindle-bearing protecting device (e.g., the spindle-bearing protecting device 1, 2 described later) according to the present invention is a device for protecting a bearing (e.g., the bearing 14, 24 described later) that supports a spindle (e.g., the spindle 153 described later), including: a rotating part (e.g., 15, 25 described later) provided more to an outer side in an axial direction than the bearing, and having a rotor blade (e.g., 151, 251 described later) that rotates along with the spindle; a supply part (e.g., the supply part 12, 22 described later) that supplies coolant or lubricant to between the rotor blade and the bearing; a detection unit (e.g., the detection unit 13, 23 described later) that detects abnormality of the bearing; and a control unit (e.g., the control unit 11, 21 described later) that controls a supply of coolant or lubricant by way of the supply part and the revolution speed of the spindle, in a case of the detection unit detecting abnormality of the bearing.

It is preferable for the detection unit to detect abnormality of the bearing in a case of any one among frequency of the bearing, temperature of the bearing, and volume of sound producing from the bearing changing to exceed a predetermined threshold or a predetermined change rate.

It is preferable for the coolant or the lubricant to be any one of oil, water, grease and compressed gas.

It is preferable for the rotating part to be configured to include an electric motor rotor (e.g., the electric motor rotor 152 described later) of an electric motor (e.g., the electric motor 3 described later).

It is preferable for the rotating part to be configured to include a spindle rotor (e.g., the spindle rotor 252 described later) of a spindle body (e.g., the spindle head 256 described later).

In addition, a machine tool (e.g., the machine tool 4 described later) according to the present invention includes any of the above-mentioned spindle-bearing protecting devices.

According to the present invention, it is possible to provide a spindle-bearing protecting device that captures an indication of failure of the spindle bearings of a machine tool and can prolong the time until the main bearing is scorched.

DETAILED DESCRIPTION OF THE INVENTION

Hereinafter, embodiments of the present invention will be explained in detail while referencing the drawings. It should be noted that, in the explanation of the second embodiment, the same reference symbols will be assigned for configurations shared with the first embodiment, and explanations thereof will be omitted.

First Embodiment

Figure 1:
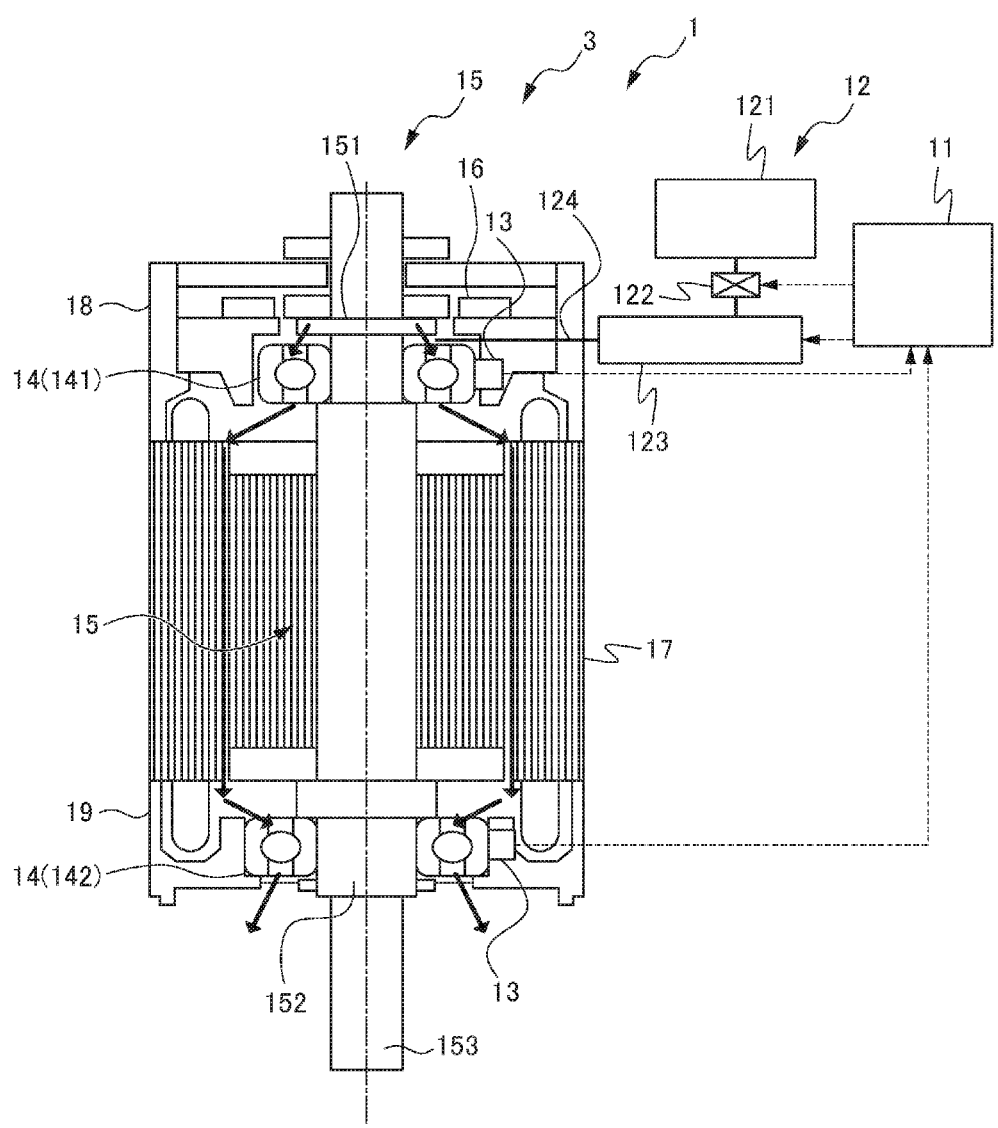
FIG. 1 is a view showing the configuration of a spindle-bearing protecting device according to a first embodiment.

FIG. 1 is a view showing the configuration of a spindle-bearing protecting device 1 according to a first embodiment of the present invention. The spindle-bearing protecting device 1 according to the present embodiment is provided to an electric motor 3, and protects a bearing 14 which supports a spindle 153 of the electric motor 3 to be rotatable. This spindle-bearing protecting device 1 includes a rotating part 15 having a rotor blade 151, a detection unit 13 that detects abnormality in the bearing 14, a supply part 12 that supplies coolant or lubricant, and a control part 11 that controls the supply of coolant or lubricant by the supply part 2 and the revolution speed of the rotating part 15.

The supply part 12 is configured to include a storage part 121, a release valve 122, a compressing part 123, and a supply pipe 124.

The coolant or lubricant stored in the storage part 121 is introduced to the compressing part 123 through the release valve 122, when the release valve 122 is opened by the control part 11. The compressing part 123 supplies the coolant or lubricant via the supply pipe 124 to the vicinity of the spindle 153 at a compression ratio designated by the control unit 11. When the control unit 11 raises the compression ratio, the supplied amount of coolant or lubricant supplied to the vicinity of the spindle 153 increases in response thereto. On the other hand, when the control unit 11 lowers the compression ratio, the supplied amount of coolant or lubricant transported to the vicinity of the spindle 153 decreases in response thereto.

In more detail, the leading end of the supply pipe 124 is arranged between the rotor blade 151 and the bearing 14 (upper bearing 141). The supply part 12 thereby supplies coolant or lubricant between the rotor blade 151 and bearing 14.

As the bearing 14, a contactless sealed bearing suited to high-speed rotation is preferably used. As can be seen in FIG. 1, the bearing 14 is configured to include a bearing 141 arranged above towards the paper plane of FIG. 1 (similar hereinafter) and a bearing 142 arranged below, to interpose an electric motor stator 17. The upper bearing 141 is supported by a top bracket 18, and the lower bearing 142 is supported by a bottom bracket 19.

The rotating part 15 is configured to include the rotor blade 151, electric motor rotor 152, and spindle 153. The rotor blade 151 is provided more to an outer side in the axial direction (upwards) than the bearing 141 arranged above, and is formed in an annular shape around the spindle 153. In addition, the rotor blade 151 and electric motor rotor 152 are integrated relative to the spindle 153 from above. In other words, the axes of rotation of these match, and rotate integrally.

In more detail, the rotor blade 151 is integrally installed with the spindle 153, above the supply pipe 124 included in the supply part 12, and below the electric motor rotation sensor 16 which detects the revolution speed of the rotating part 15. Although coolant or lubricant is supplied to the lower side of the rotor blade 151 by the supply pipe 124 equipped to the supply part 12 as described above, the flow of coolant or lubricant from above to below is formed by the rotor blade 151 rotating accompanying rotation of the spindle 153. The coolant or lubricant directed downwards by the rotor blade 151 passes through the electric motor stator 17 through the upper bearing 141 to arrive at the lower bearing 142.

The detection unit 13 detects at least one among the frequency of the bearing 14, temperature of the bearing 14, and volume of sound producing from the bearing 14. Based on this detection result, abnormality of the bearing 14 is detected, and the above-mentioned detection result, and in the case of detecting an abnormality, also an abnormality detection result, are sent.

The control unit 11 controls the supply of coolant or lubricant from the supply part 12 and the revolution speed of the spindle 153 (rotating part 15), based on the detection result and abnormality detection result received from the detection unit 13.

It should be noted that at least one among oil, water, grease and compressed gas may be used as the above-mentioned coolant or lubricant.

Figure 2:
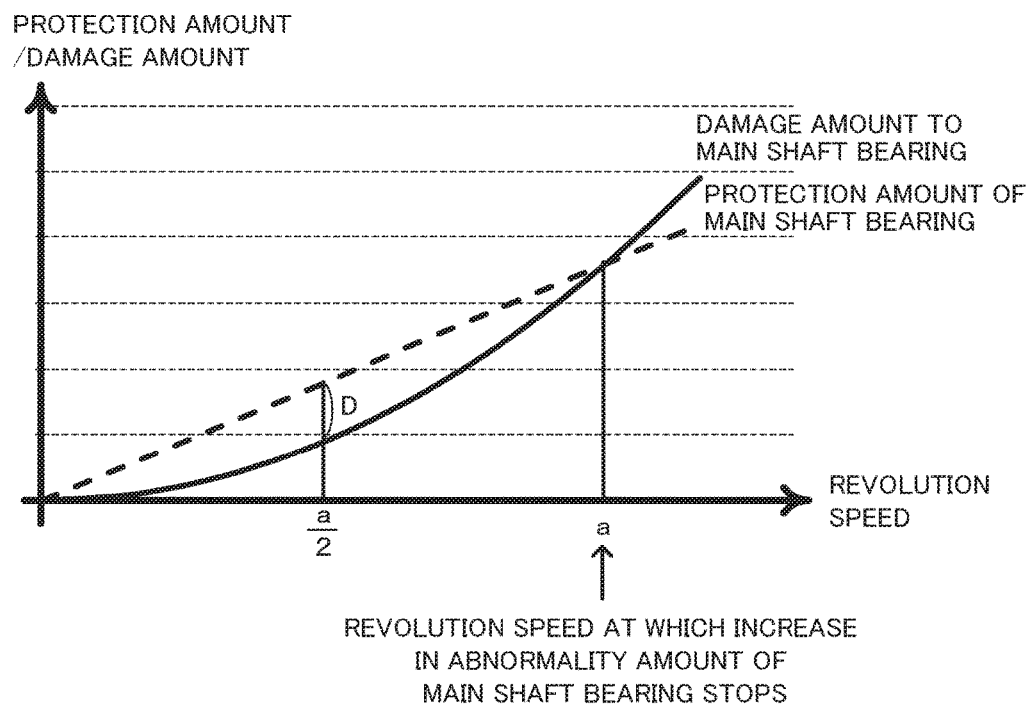
FIG. 2 is a schematic chart of a spindle-bearing protecting method of the present invention.

FIG. 2 is a graph showing a schematic chart for control of the supply of coolant or lubricant and revolution speed of the spindle 153 (rotating part 15) by the control unit 11.

Herein, the protection amount of the bearing (spindle bearing) 14 is proportional to the flow rate of coolant or lubricant. In addition, the maximum flow rate of coolant or lubricant is proportional to the revolution speed of the rotor blade 151, i.e. revolution speed of the spindle 153 (rotating part 15), in the case of the compression ratio being fixed. In other words, the protection amount of the bearing 14 is proportional to the motor revolution speed. Showing this is a graph depicted by a dotted line in FIG. 2.

On the other hand, the damage amount of the bearing 14 is proportional to the pressure (centrifugal force) on the bearing moving body, and thus is proportional to the square of the revolution speed of the spindle 153 (rotating part 15). Showing this is a graph depicted by a solid line in FIG. 2.

When stated concretely, at a high pressure such that the coolant or lubricant penetrates the bearing seal of the bearing 14, it is possible to oppose the high pressure of the coolant or lubricant more as the revolution speed of the spindle 153 and rotor 151 increases, upon supplying coolant or lubricant to the bearing 14. It is thereby possible to supply an abundance of coolant or lubricant to inside of the bearing 14, and thus the life-span prolongation effect of the bearing 14 increases. On the other hand, the bearing 14 tends to break more with higher revolution speed of the spindle 153. Therefore, the abnormality amount is fed back to the control unit 11, and the control unit 11 controls the supply amount of coolant or lubricant and the revolution speed of the spindle 153 so that the increase in the abnormality amount of the bearing 14 (frequency of bearing 14, temperature, abnormal amount of volume of sound producing from bearing) becomes a minimum.

In FIG. 2, since the protection amount and damage amount to the bearing 14 are balanced at the revolution speed=a, the abnormality amount of the bearing 14 detected by the detection unit 13 increases to the right from frequency=a, i.e. frequencies higher than a. Conversely, at the left from the revolution speed=a, i.e. frequencies lower than a, the abnormality amount declines since the protection amount of the bearing 14 exceeds the damage amount. Especially, in the case of the frequency=a/2, since the difference D by subtracting the damage amount of the bearing 14 from the protection amount of the bearing 14 reaches a maximum, it becomes possible to maximally prevent an increase in the abnormality amount of the bearing 14.

Therefore, in the present embodiment, since the spindle 153 is made to rotate as long as possible, in the case of the above-mentioned abnormality amount changing to exceed a predetermined threshold, or to exceed a predetermined change rate, the supply part 12 supplies coolant or lubricant to the bearing 14. Even when the maximum flow rate is supplied, in the case of the abnormality amount increasing, the control unit 11 will drop the revolution of the spindle 153 (rotating part 15) to a revolution speed at which the abnormality amount detected by the detection unit 13 no longer increases. After confirming stopping of the increase in the abnormality amount, the control unit 11 maximally prevents an increase in abnormality amount by dropping the revolution speed of the spindle 153 (rotating part 15) to a revolution speed that is half of the revolution speed when stopping the abnormal amount increase, and thus it is possible to use the spindle 153 the longest possible. It should be noted that, by simply supplying the maximum flow rate of coolant or lubricant, although the abnormality amount no longer increases, in the case of the abnormality amount shifting to increase again after a long time, it may be configured so that the control unit 11 drops the revolution speed of the spindle 153 (rotating part 15) to a revolution speed that is half of the revolution speed at the moment when the increase in abnormality amount temporarily stops.

As mentioned above, taking into consideration that the damage amount to the bearing 14 is proportional to the square of the revolution speed of the spindle 153, while at the same time as having in the rotor body 151 the characteristic of the maximum flow rate of coolant or lubricant being proportional to its own revolution speed, the control unit 11 executes the above-mentioned control of the supply amount of coolant or lubricant and revolution speed in order to make the spindle 153 and bearing 14 last the longest time.

Figure 3:
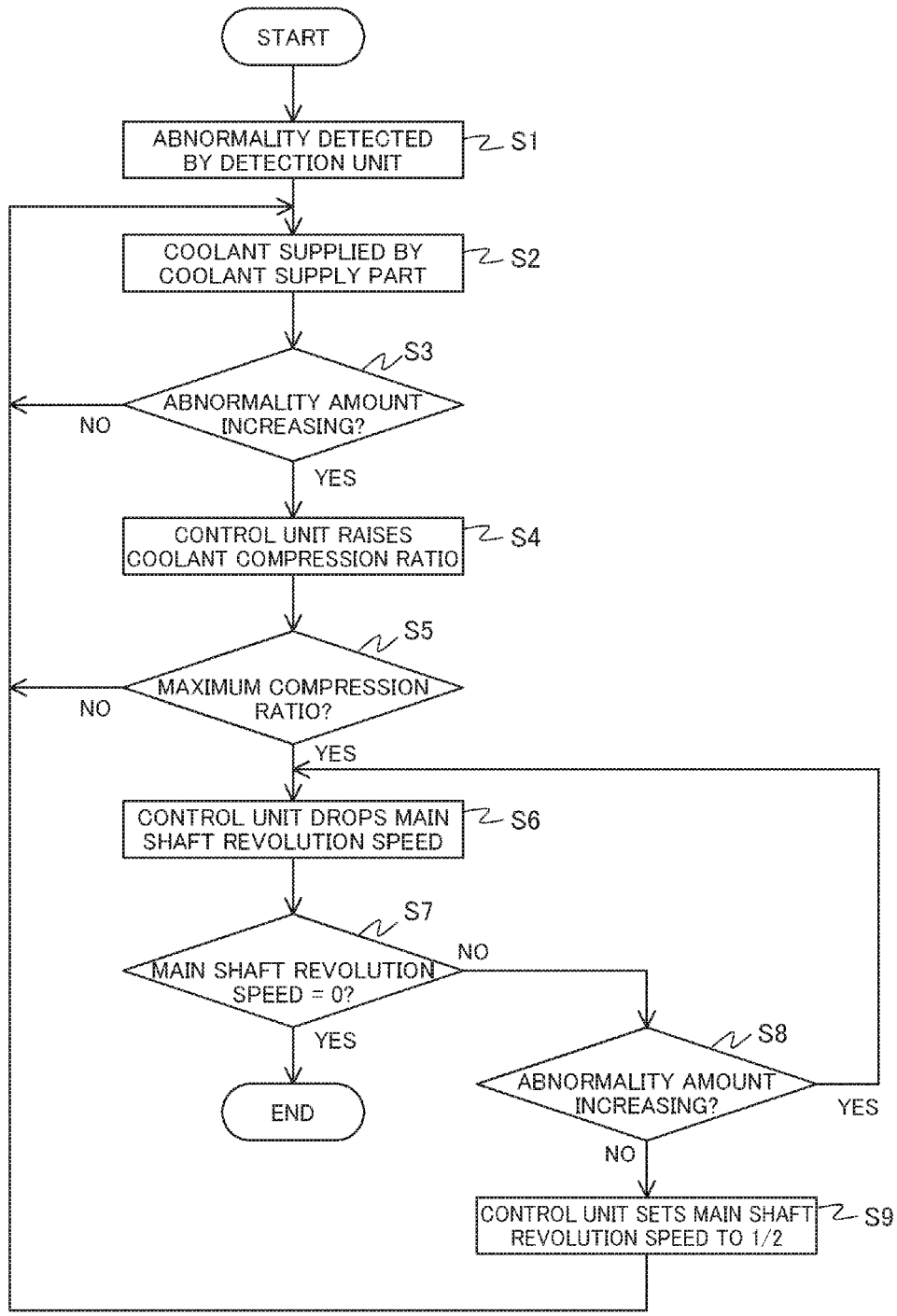
FIG. 3 is a flowchart showing processing of the spindle-bearing protecting device of the present invention.

FIG. 3 is a flowchart showing the processing of the spindle-bearing protecting device 1 according to the present embodiment.

First, in Step S1, the detection unit 13 detects abnormality of the bearing 14.

Next, in Step S2, the supply part 12 supplies coolant or lubricant to the bearing 14.

Next, in Step S3, the detection unit 13 determines whether or not the abnormality amount of the bearing 14 (abnormality amount of frequency of the bearing 14, temperature, volume of sound producing from the bearing) is increasing. In the case of this determination being YES, the processing advances to Step S4. In the case of this determination being NO, the processing returns to Step S2, and continues the supply of coolant or lubricant by the supply part 12.

Next, in Step S4, the control unit 14 raises the compression ratio of the compressing part 123.

Next, in Step S5, the control unit 11 determines whether the compression ratio at the current time is a maximum compression ratio. In the case of this determination being YES, the processing advances to Step S6. In the case of this determination being NO, the processing returns to Step S2, and continues the supply of coolant or lubricant by the supply part 12.

Next, in Step S6, the control unit 11 drops the revolution speed of the spindle 153.

Next, in Step S7, the control unit 11 determines whether or not the revolution speed of the spindle 153 became 0. In the case of this determination being YES, the processing of the spindle-bearing protecting device 1 according to the present embodiment is ended. In the case of this determination being NO, the processing advances to Step S8.

Next, in Step S8, the detection unit 13 determines whether the abnormality amount of the bearing 14 is increasing. In the case of this determination being YES, the processing returns to Step S6, and the control unit 11 further drops the revolution speed of the spindle 153. In the case of this determination being NO, i.e. in the case of an increase in abnormality amount stopping, the processing advances to Step S9.

Next, in Step S9, the control unit 11 drops the revolution speed of the spindle 153 to a revolution speed that is ½ of the revolution speed of the spindle 153 at the moment stopping the abnormality amount increase.

Subsequently, the processing returns to Step S2, and continues the supply of coolant or lubricant by the supply part 12.

In the above way, the control unit 11 controls the supply amount of coolant or lubricant and the revolution speed of the spindle 153, based on the abnormality amount in the bearing 14 detected by the detection unit 13 in the spindle-bearing protecting device 1 of the present embodiment. In addition, as described above, among the plurality of bearings 14, the coolant or lubricant is supplied to the bearing 14 that is above the supply part, using the rotor blade 151 provided below an electrical component such as the electric motor rotation sensor which detects the revolution speed of the rotating part. Therefore, it becomes possible to prolong the life of the bearing 14, while preventing scorching of the bearing 14, without giving a specific structure to a normal contactless sealed bearing. The possibility thereby rises of being able to realize repair in the case of damage occurring to the spindle 153 during the maintenance period of a machining line. In addition, since there is no necessity for using a bearing 14 having a special structure, it is possible to standardize components and possible to minimize the cost increase.

Furthermore, by the rotor blade 151 rotating, a flow of coolant or lubricant from top to bottom is formed, and the coolant or lubricant will not adhere to electrical components. It is thereby possible to efficiently supply coolant or lubricant to the inside of the bearing 14.

Second Embodiment

Figure 4:
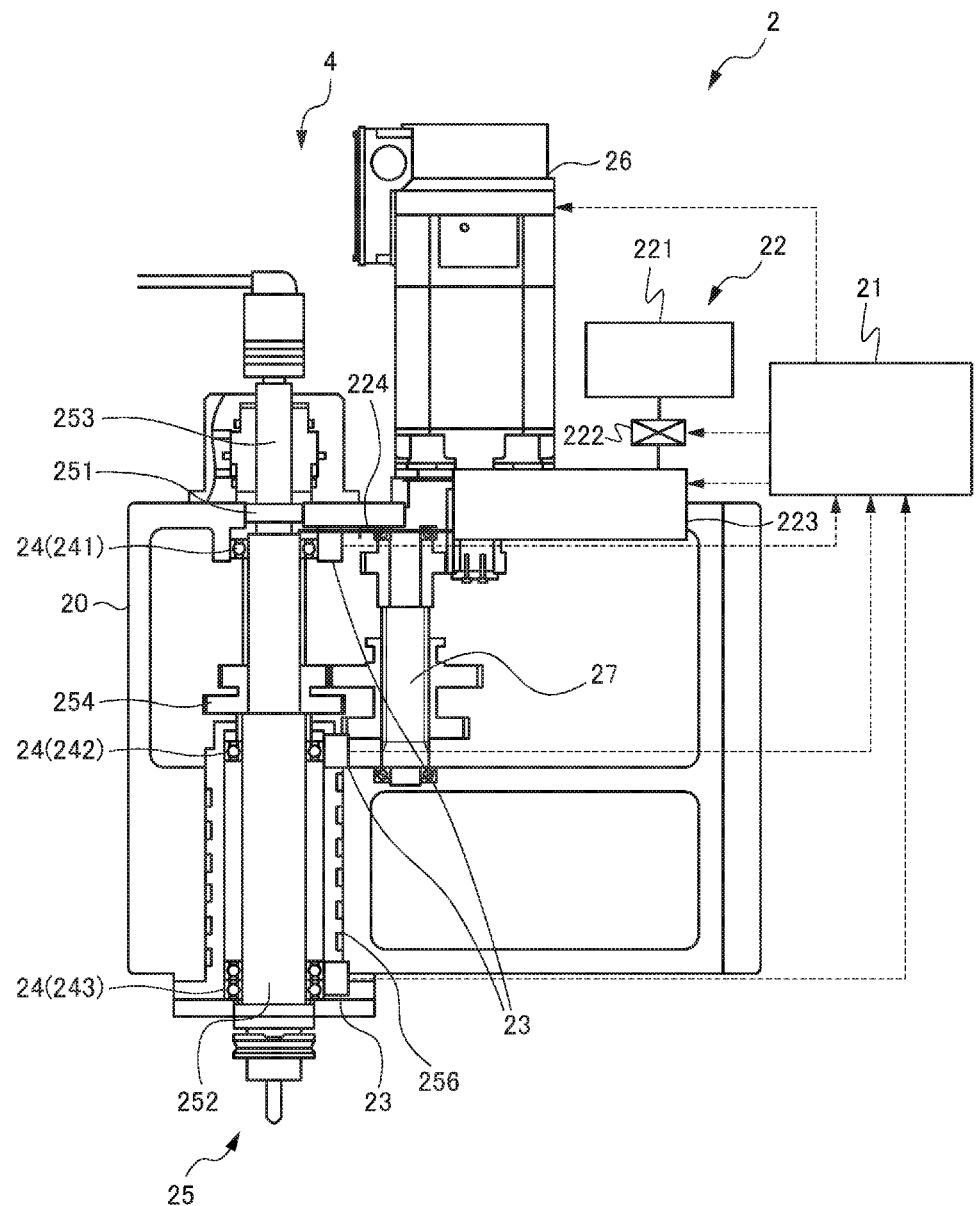
FIG. 4 is a view showing the configuration of a spindle-bearing protecting device according to a second embodiment.

FIG. 4 is a view showing the configuration of a spindle-bearing protecting device 2 according to a second embodiment of the present invention.

Among the constituent elements of the spindle-bearing protecting device 2 according to the second embodiment, each of a control unit 21, supply part 22, detection unit 23 and bearing 24 have the same configuration as each of the control unit 11, supply part 12, detection unit 13 and bearing 14 among the constituent elements of the spindle-bearing protecting device 1 according to the first embodiment. For example, the supply part 22 is configured to include a storage part 221, a release valve 222, a compressing part 223, and a supply pipe 224.

Although the spindle-bearing protecting device 1 according to the first embodiment detects abnormality of the bearing 14 which supports the spindle 153 of the electric motor 3 to be rotatable, the spindle-bearing protecting device 2 according to the second embodiment detects abnormality of the bearing 24 used in rotation of the spindle 253 (spindle rotor 252) of a machine tool 4 coupled to a spindle electric motor 26.

It should be noted that the bearings 24 are configured to include a bearing 241 arranged above, a bearing 242 arranged in the middle, and a bearing 243 arranged below, and abnormality of these bearings is detected. In addition, the arrangement of the rotor blade 251 is arranged above the bearing 241, which is arranged above, similarly to the first embodiment.

More specifically, the spindle-bearing protecting device 2 according to the second embodiment differs compared to the spindle-bearing protecting device 1 according to the first embodiment in the point of the rotating part 25 including the spindle rotor 252 and coupling gear 254, and the point of the rotating part 25 and detection unit 23 equipping to the spindle head 256.

More specifically, the rotating part 25 is supported by the spindle head 256 within a housing 20 of the machine tool 4 to be rotatable, as shown in FIG. 4. In the rotating part 25, the coupling gear 254 is integrated with the spindle 253, and the axes of rotation of each of these match. Furthermore, by the coupling gear 27 on the spindle electric motor 26 side and the coupling gear 254 included in the rotating part 25 on the machine tool 4 side engaging with each other, the rotation of the rotor of the spindle electric motor 26 is transmitted to the rotation of the rotating part 25.

The detection unit 23 detects abnormality of the bearing 24 for rotating the spindle 253 on the machine tool 4 side, not the spindle electric motor 26.

The operation flow itself after detecting abnormality of the bearing 24 is the same as the operation flow of the spindle-bearing protecting device 1 illustrated in FIG. 3.

Also in the second embodiment, it becomes possible to prolong the life of the bearing 24, while preventing scorching of the bearing 24, without giving a special structure to a normal contactless sealed bearing, similarly to the first embodiment. The possibility thereby rises of being able to realize repair in the case of damage occurring to the spindle 253 during the maintenance period of a machining line. In addition, since there is no necessity for using a bearing having a special structure, it is possible to standardize components and possible to minimize the cost increase.

Furthermore, by the rotor blade 251 rotating, a flow of coolant from top to bottom is formed, and the coolant will not adhere to electrical components. It is thereby possible to efficiently supply coolant or lubricant to the inside of the bearing 24.

In addition, it becomes possible to maximally prevent damage of the spindle 253 of the machine tool 4 being used by coupling with an electric motor.

Although the first and second embodiments of the present invention are explained above, the present invention is not to be limited to these embodiments. In addition, the effects described in these embodiments are merely listing the most preferred effects produced from the present invention, and the effects by the present invention are not to be limited to those described in these embodiments.

In the first and second embodiments of the present invention, the detection unit detects abnormality of the bearing based on the detection of any one or a combination of the frequency of the bearing, temperature of the bearing and volume of noise producing from the bearing; however, the detection method for abnormality of the bearing is not limited thereto. For example, it may detect abnormality of the bearing based on detection of the frequency of noise producing from the bearing.

The control method by the spindle-bearing protecting device 1 or 2 is realized by way of software. In the case of realizing by software, the program constituting this software is installed in a computer (spindle-bearing protecting device 1 or 2). In addition, these programs may be recorded on removable media and distributed to users, or may be distributed by being downloaded to the computer of the user via a network. Furthermore, these programs may be provided to the computer of the user (spindle-bearing protecting device 1 or 2) as a Web service via a network without being downloaded.

EXPLANATION OF REFERENCE NUMERALS 1, 2 spindle-bearing protecting device
3 electric motor
4 machine tool
11, 21 control unit
12, 22 supply part
13, 23 detection unit
14, 24 bearing
15, 25 rotating part
121, 221 storage part (supply part)
122, 222 release valve (supply part)
123, 223 compressing part (supply part)
124, 224 supply pipe (supply part)
151, 251 rotor blade
152 electric motor rotor
153, 253 spindle
252 spindle rotor
256 spindle head (spindle body)

What is claimed is:

1. A spindle-bearing protecting device for protecting a bearing that supports a spindle so as to be rotatable, comprising:
a rotating part positioned further to an outer side in an axial direction than the bearing, and having a rotor blade configured to rotate along with the spindle;
a supply part configured to supply coolant or lubricant between the rotor blade and the bearing;
a detection unit configured to detect abnormality of the bearing; and
a control unit configured to control a supply of the coolant or the lubricant by the supply part and a revolution speed of the spindle, in a case where the detection unit detects an abnormality amount of the bearing,
wherein:
the supply part is configured to supply the coolant or the lubricant to the bearing in a case where the abnormality amount changes so as to exceed a predetermined threshold or to exceed a predetermined change rate, and even when a maximum flow rate is supplied, in a case where the abnormality amount increases, the control unit is configured to drop the revolution speed of the spindle to a first revolution speed at which the abnormality amount no longer increases, then after confirming stopping of the increase in the abnormality amount, the control unit is further configured to drop the revolution speed of the spindle to a second revolution speed that is lower than the first revolution speed.

2. The spindle-bearing protecting device according to claim 1, wherein the abnormality amount is an amount representing any one among frequency of the bearing, temperature of the bearing, and volume of sound produced from the bearing.

3. The spindle-bearing protecting device according to claim 1, wherein the coolant or the lubricant is any one of oil, water, grease and compressed gas.

4. The spindle-bearing protecting device according to claim 1, wherein the rotating part is configured to include an electric motor rotor of an electric motor.

5. The spindle-bearing protecting device according to claim 1, wherein the rotating part is configured to include a spindle rotor of a spindle body.

6. A machine tool comprising the spindle-bearing protecting device according to claim 1.

7. The spindle-bearing protecting device according to claim 1, wherein:
the supply part is configured to include a storage part, a release valve, a compressing part, and a supply pipe, and
a leading end of the supply pipe is between the rotor blade and the bearing.

8. The spindle-bearing protecting device according to claim 1, wherein the bearing is supported by a bracket.

9. The spindle-bearing protecting device according to claim 8, wherein the bearing is a first bearing and the bracket is a first bracket, and the spindle-bearing protecting device further comprises a second bearing supported by a second bracket.

\* \* \* \* \*